INVENTORS
WILLIAM N. VAN HOOSE
AND ROBERT S. ROCKFORD
BY
ATTORNEY

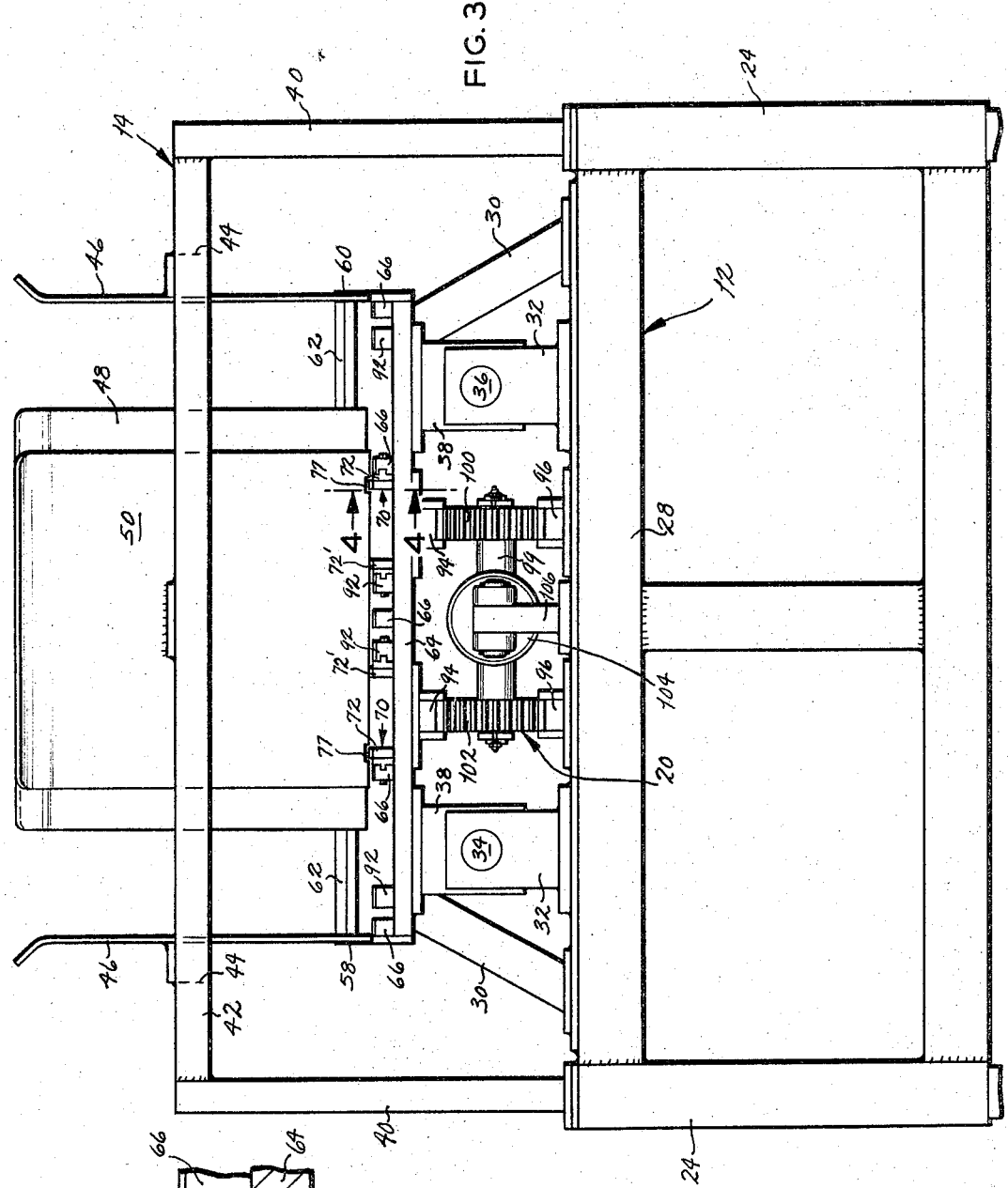

United States Patent Office 3,312,463
Patented Apr. 4, 1967

3,312,463
RECIPROCATING FEED APPARATUS FOR PROGRESSIVELY DELIVERING WORKPIECES TO A PRESS, OR THE LIKE
William N. Van Hoose, East St. Louis, Ill., and Robert S. Rockford, Overland, Mo., assignors to Engel Equipment, Inc., St. Louis, Mo., a corporation of Missouri
Filed Feb. 15, 1965, Ser. No. 432,712
7 Claims. (Cl. 271—10)

The present invention relates generally to apparatus for feeding articles, such as metal workpieces commonly referred to as blanks, from one position to another, and more particularly to a conveying mechanism for bottom-feeding sheet metal blanks from a stack to indexed waiting stations, and thence to subsequent processing machinery, such as a press.

Heretofore, the operating speed of automatic feeders which index workpieces to sheet metal presses and the like has been a limiting factor in the speed of the press itself. For example, the transfer members of some feeders not only undergo planar movements toward and away from the press, but they also move up and down to lift and deposit workpieces during the lengthy cycle. Also, the use of such feeders has required additional apparatus for separating the workpieces where they are supplied from a stack.

It is the general purpose of this invention to provide unique feed apparatus which separates, transfers and feeds the workpieces one at a time wherein rapid, yet simple reciprocable movements are employed.

The objects of the present invention include providing such a feed apparatus by which a blank is deliverey from a hopper, by the simple reciprocation of a delivery rack, to a waiting station, and whereby on progressive advancement the blank is engaged from above by the reciprocating mechanism and carried forwardly and delivered into such a press or other machine in which it is to be worked upon.

Further objects include the utilization, with such a reciprocating rack, of permanent magnetic means to engage from above a workpiece theretofore supported from below, and to advance it forwardly for feeding into such a press; and to use such magnetic means in another portion of the operating cycle to position and align workpieces for subsequent indexed movements.

In the present invention these purposes (as well as others apparent herein) are achieved generally by providing a two-level, stepped delivery rack which is reciprocably mounted to a base frame. The stepped delivery rack includes a lower, aft support table portion having a plurality of parallel and spaced-apart slats, whose upper surfaces establish a planar delivery path for workpieces conveyed by the rack. Forward of the aft support table portion of the rack, projecting rails extend forwardly above the delivery path. When the delivery rack is in its aft position, the forward ends of these rails are retracted to a position removed from the press.

Fixedly secured to the base frame at the forward portion of the delivery path are a plurality of waiting station slats whose upper surfaces are provided at the same level as the delivery rack slats. The waiting station slats are staggered laterally with respect to the delivery rack slats so that both sets of slats become nested when the delivery rack is moved to its forwardmost position. The waiting station slats include means for detaching and retaining a workpiece conveyed to their upper surfaces by the support table portion of the delivery rack. Grasping means carried at the undersurface of the forwardly-extending delivery rack rails engage the workpiece so detached to further advance it on the subsequent forward stroke of the delivery rack.

Utilization of the invention will become apparent to those skilled in the art from the disclosures made in the following description of the preferred embodiment of the invention as illustrated in the accompanying drawings, in which:

FIG. 3 is a rear view of the reciprocating feed apparatus of FIG. 1; and

FIG. 4 is an enlarged cross-sectional detail of the stripping and ejection dogs employed in the present invention.

Figure 1:
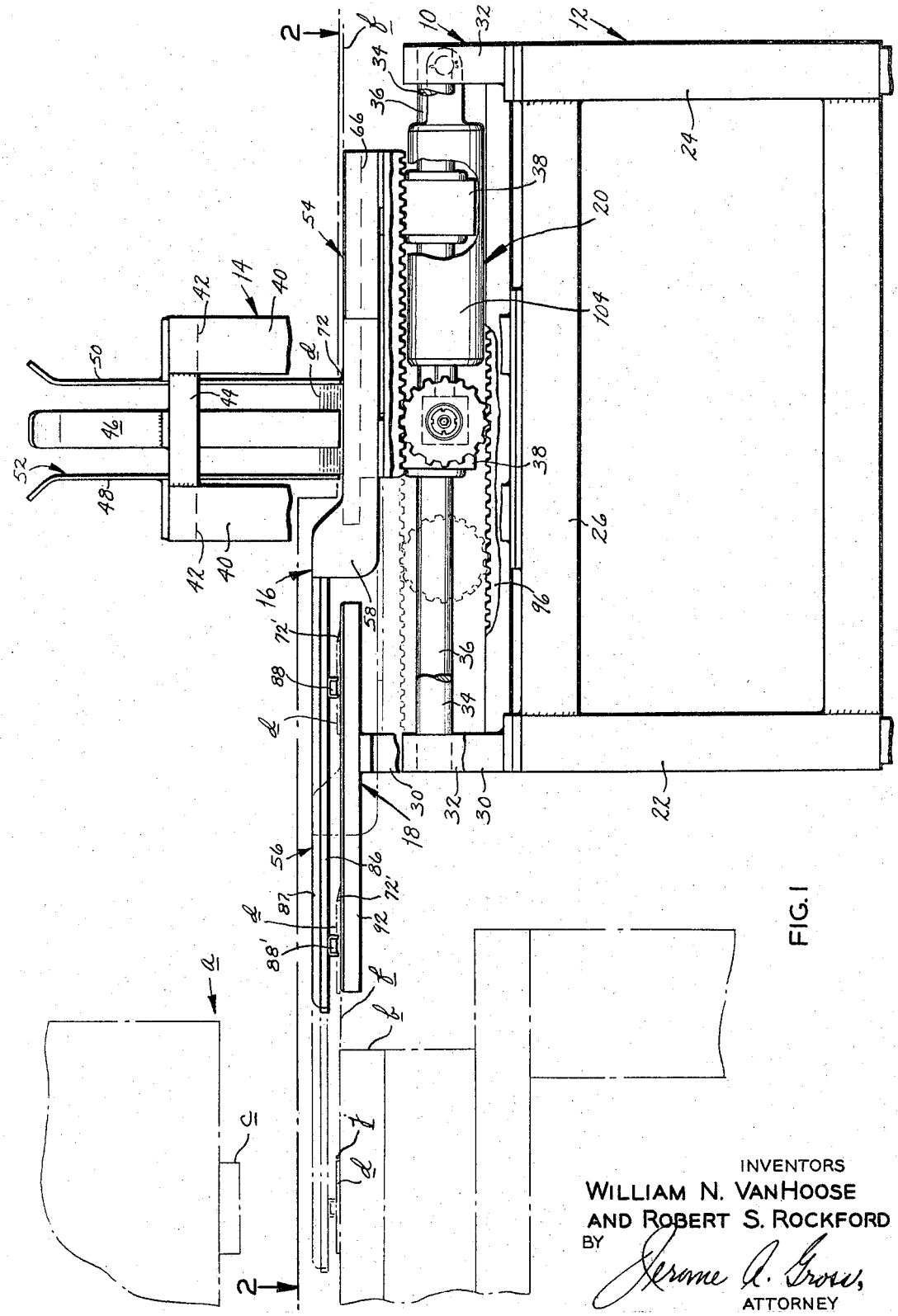
FIG. 1 is a side elevational view of the reciprocating feed apparatus of the present invention, parts of the view being in section and other parts being broken away or omitted to facilitate illustration of prominent features, the phantom lines representing the forwardly-extended feed position and a punch press fed thereby.

Referring now to the drawings wherein like reference characters designate like or corresponding parts throughout the several views, there is shown in FIG. 1 a reciprocating feeder, generally designated 10. As will later be described more fully, the reciprocating feeder 10 comprises a main base frame 12, an auxiliary hopper frame 14, a slidably mounted delivery rack 16, a workpiece waiting station 18, and a driving mechanism 20. The reciprocating feeder 10 is shown spaced from a press $a$ having a die part $b$ which co-operates with a punch $c$ to stamp workpieces or sheet metal blanks $d$ delivered thereto.

BASE FRAME

The base frame 12 of the reciprocating feeder 10 is a support structure having forward and aft pairs of upright columns 22 and 24, respectively, which spacedly support longitudinally-extending and laterally-extending beams 26 and 28 respectively, above floor or track-engaging wheels (not shown). The forward laterally-extending beam 28 supports spaced-apart, inclined legs 30 which mount the waiting station 18, to be described herein after.

Suitable brackets 32 are welded to the laterally-extending beams 28 and are arranged so that the ends of two parallel, cylindrical shafts 34 and 36 may be mounted therein. Two slidable bearings 38 serve to mount the delivery rack 16 on the cylindrical shafts 34, 36 in such arrangement that the rack 16 may be reciprocated forward and aft over the cylindrical shafts 34, 36. As may best be seen in FIG. 2 the shafts 34, 36 extend longitudinally and are spaced apart from each other so as to be symmetrically disposed to each side of the longitudinal center line, designated $e$—$e$, of the reciprocating feeder 10.

AUXILIARY HOPPER FRAME

The auxiliary hopper frame 14 includes four upright legs 40 which extend upwardly from the longitudinally-extending beams 26 to position two parallel and spaced apart laterally-extending rails 42 above the base frame 12. Welded between the laterally-extending rails 42 and spaced from each other are two short longitudinally-extending rails 44 as may best be seen in FIGS. 1 and 3. Side, forward, and aft plates 46, 48 and 50 are welded to the rails 44 and 42 so as to provide an open-bottom hopper, generally designated 52. Shown stacked within the open-bottom hopper 52 are sheet metal blanks $d$ which are aligned by the hopper plates 46, 48 and 50 with the lowermost blank presented to the opening at the bottom of the hopper 52. Although the plates 46, 48 and 50 which form the hopper 52 have been described as rigidly secured to the hopper frame 14, it should be understood that these plates could be mounted by slotted members and suitable fasteners so that the hopper size may be adjusted to accommodate workpieces of different sizes.

DELIVERY RACK

The delivery rack 16 is mounted for fore and aft reciprocation by means of the bearings 38 and cylindrical shafts 34, 36 as described hereinabove. The rack is stepped into two portions provided at different levels and joined by riser portions. As may best be seen in FIG. 1, the aft lower support portion 54 and forward upper portion 56 of the rack 16 are joined by intermediate riser portions 58, 60 spaced laterally from each other and connected to each other by a bridging bar 62.

The bearings 38 which slide along the longitudinally-extending shafts 34, 36, have their upper portions secured to a flat plate-like member 64 which carries a plurality of parallel, spaced-apart slats 66. In the embodiment shown, five of these slats 66 comprise the aft support table portion 54 of the delivery rack 16. These slats 66 extend forward of the flat support plate member 64, see FIG. 2, and have their upper surfaces presented to the open bottom of the hopper 52 when the rack is in its retracted position, see FIG. 1. In this position the plurality of slats 66 serve as a lay-up surface for blanks deposited upon them from the hopper. Thus the upper surfaces of the slats 66 establish a lay-up delivery plane f—f, and upon reciprocation of the rack 16, define a planar path along which ejected blanks d travel forward of the hopper 52.

Referring now to FIGS. 1 and 3 the bottom edge 68 of the forward hopper plate 48 is spaced above the upper surfaces of the slats 66 by a distance which is greater than the thickness of one sheet metal blank d but less than twice such thickness. By such arrangement sheet metal blanks d are ejected from the hopper one at a time upon each forward stroke of the delivery rack 16.

Figure 2:
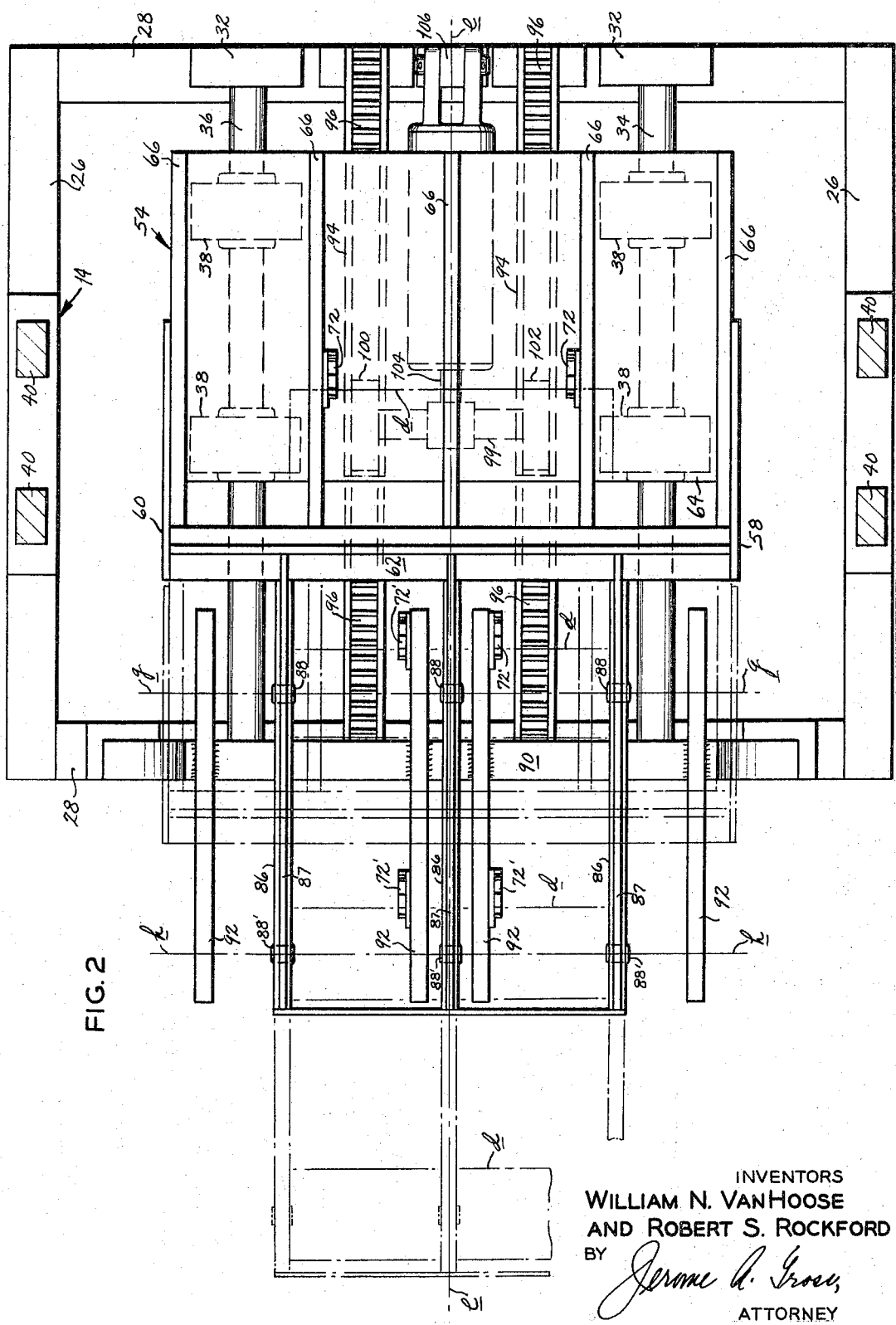
FIG. 2 is a sectional view taken along the line 2—2 of FIG. 1.

The impetus for sheet metal blank ejection is obtained by hopper-unloading strippers, generally designated 70. As shown in FIGS. 2 and 3, these strippers are mounted by suitable fasteners to the sides of the slats 66 and take the form of spring-urged dogs 72, as shown in detail in FIG. 4. The dogs 72 are pivotally mounted at their lower ends so that their upper ends may be urged upwardly by springs 74 provided between the dogs 72 and spring-mounting ledges 76. The upper ends of the dogs have leading edges 78 aft of which are provided beveled portions 80. Upon the return stroke of the rack 16, the beveled portions 80 serve as cam surfaces to retract the dogs 72 as they are drawn beneath the stacked sheet metal blanks d. Thus, the projectable upper ends of the dogs 72 are retracted below the delivery plane f—f on the return stroke of the delivery rack 16, and projected upward above such plane by the springs 74 when the dogs 72 have passed under the aft edge of the blanks d. Stops 82 are provided to limit the projection of the dogs 72 above the delivery plane f—f so that only the lowermost blank in the hopper 52 is carried forward by the dogs. A similar dog may be provided on the die part b within the punch press a, as indicated in FIG. 1.

When projected upward by means of the springs 74 each dog 72 carried by the slats 66 co-operates with slotted openings 77 at the lower edge of the aft hopper plate 50 to eject the lowermost blanks d from the hopper 52.

The riser portions 58, 60 are welded to the flat plate member 64 along the forward portion of its sides. These riser portions 58, 60 extend vertically upward and are spaced laterally outward so as to be out of vertical alignment with the hopper side plates 46. In this manner lateral clearance is provided between the riser portions 58, 60 and the workpieces d as the delivery rack 16 is reciprocated. The upper ends of the riser portions 58, 60 terminate above the delivery plane f—f and are connected by the bridging bar 62.

Projecting forwardly from the bridging bar 62 and above the delivery path of the blanks d are three longitudinally-extending, parallel, arm-like rails 86, having central reinforcing ribs 87 for greater strength. The length of each of the rails 86 is such that, in the aft position of the delivery rack 16, the forward ends of the rails 86 are retracted over the waiting station 18, while in their forward position, these ends project in to the press a.

To the undersurfaces of each of the rails 86 are mounted first and second sets of grasping means 88, 88' for engaging the sheet metal blanks d at the level of the delivery plane f—f. In the embodiment illustrated these grasping means are a first set 88 and a second set 88' of permanent magnets which are presented downwardly to grasp the sheet metal blanks d from above. Each set consists of three magnets laterally aligned, one on the undersurface of each of the rails 86. The sets are separated forward and aft of each other by the length of the reciprocating stroke.

WAITING STATION

The waiting station 18 is here shown as slotted platform 90 supported at each side by the inclined legs 30. It is along the path of the blanks d at the level of the upper surfaces of the table slats 66, which together comprise the lower support table portion 54 of the delivery rack 16. It will be apparent that any number of waiting station positions may be specified, each being equally spaced from the other an amount determined by the stroke length of the delivery rack 16. In the embodiment shown the waiting station 16 is provided with two positions to which the workpieces d are sequentially indexed by the delivery rack 16. Provided upon the waiting station platform 90 are four parallel and longitudinally-extending slats 92 whose upper surfaces lie in the same plane as that of the upper surfaces of the delivery rack slats 66. The slats 92 are staggered laterally with respect to the support table slats 66 and their ends 93 project sufficiently aft of the platform 90 so as to permit the delivery rack support table slats 66 to nest between them, when the delivery rack is in its forwardmost position.

On each side of center, the waiting station slats 92 are provided with means for disengaging the sheet metal blanks d from the aft support table portion 54 of the delivery rack 16 and retaining them supported upon the waiting station slats 92. Such disengaging and retaining means consist of sets of laterally-aligned, spring-urged dogs 72', which may be identical to the spring-urged dogs 72 carried by the delivery rack slats 66. One set of the dogs 72' serves to establish a first waiting station position designated by dashed line g—g toward the aft end of the waiting station 18 and the other set serves to establish a second waiting position designated by dashed line h—h, near the forward end of the waiting station 18.

DRIVING MECHANISM

An upper pair of toothed racks 94 is secured to the undersurface of the flat plate member 64 of the delivery rack and a pair of similar lower racks 96 is suitably mounted on the base frame 12 in vertcal registration with the upper racks 94. A laterally-extending shaft 99 is provided at its ends with the pinions 100, 102 engaging the upper and lower pairs of racks 94, 96. The lateral shaft 99 is mounted in the forward end of a pneumatic linear actuator 104 whose rear end is mounted by a bracket 105 to the frame 12. Actuation of the linear actuator 104 causes the pinions 100, 102 to be driven along the lower gear racks 96, thus moving the delivery rack forward and aft. The rack-and-pinion coupling between the actuation cylinder 104 and the delivery rack 16 provides rapid reciprocation of the delivery rack 16 in response to the actuation of the pneumatic actuator 104.

OPERATION

Sheet metal workpieces d are stacked vertically in the hopper 52 with the delivery rack 16 retracted to its aft position, as shown in FIGS. 1 and 2. Upon actuation of the drive mechanism 20, hereinabove described, the delivery rack 16 is driven forward over the shafts 34, 36. The stripper dogs 72 secured to the slats 66 of the support table portion 54 pass through the slotted openings 77 of the hopper plate 50 and eject the lowermost workpiece *d* beneath the hopper forward plate 48. As the ejected workpiece *d* is carried forward from the hopper, it is supported from below by the slats 66 of the delivery rack 16. The forward stroke continues until the forwardly-extending ends of slats 66 are nested between the waiting station slats 92. During this forward stroke, the workpiece *d* is fed forward and in so doing engages the cam-like beveled portion 80 of the first set of stripper dogs 72'. The workpiece *d* causes the upper ends of dogs 72' to be retracted below the delivery plane *f—f*. In this manner the workpiece *d* is allowed to progress forward over the stripper dogs 72', where it is temporarily supported by both the waiting station slats 92 and the delivery rack slats 66. When the trailing edge of the workpiece *d* has passed beyond the stripper dogs 72', the upper ends of the stripper dogs 72' are spring-urged upward to project above the delivery plane *f—f*.

With the workpiece *d* at its first waiting position the drive mechanism 20 is actuated to initiate the return stroke of the delivery rack 16. The workpiece *d* cannot follow the delivery rack 16 during its return stroke; the stripper dogs 72' disengage the workpiece from the delivery rack 16 and maintains it supported on the waiting station slats 92.

The first set of grasping magnets 88, which move forward to position *h—h* upon the forward stroke, are returned to their initial position *g—g* upon the return stroke of the rack 16. As they return, they engage the workpiece *d* from above; if it is forward of the stripper dogs 72', they move it along the slats 92 until its trailing edge abuts against the stripper dogs 72'.

During the next forward stroke of the delivery rack 16, they carry the workpiece *d* to the next forward waiting station position *h—h* where a similar set of stripper dogs 72' disengages it from the rack 16 and maintains it on the waiting station slats 92. A subsequent cycle of the delivery rack 16 causes the workpiece *d* to be engaged from above by the second set 88' of grasping magnets and by them to be advanced from its forwardmost waiting station position *h—h* to the press *a* where it is deposited in the die part *b*.

While the workpiece *d* progresses in the stepped sequence just described, other workpieces *d* are similarly ejected from the hopper 52 by the dogs 72 and bottom fed in sequence to the waiting station positions *g—g* and *h—h* and thence to the press *a*. Thus each cycle of reciprocation, after the second, delivers a workpiece *d* to the press *a*.

Obviously, many modifications and variations of the present invention are physical in the light of the above teaching. Therefore, it is to be understood that the invention may be practiced other than as specifically described.

We claim:
1. Apparatus for feeding metal blanks to a press or the like, comprising:
   a frame,
   a delivery rack reciprocably mounted on said frame and including
      support table means reciprocable therewith for receiving a blank supplied thereon and supporting such blank from its under surface, whereby a delivery path is established in a plane,
      further including arm means reciprocable therewith and extending longitudinally forward of said support table means and above the forward portion of such delivery path, said arm means of said rack being supported therefrom at a point spaced laterally from said path,
   together with
   means to reciprocate said delivery rack forward and aft in such delivery plane, thereby advancing the blank on the forward stroke of such reciprocation, means, supported by said frame at the level of said support table means and forwardly along said path, for supporting such blank from its under surface and retaining the blank from aft movement with the support table means on the aft stroke of such reciprocation, and
   means, carried by said arm means and presented downwardly toward such delivery plane, to engage the upper surface of the blank there retained at an aft point of reciprocation and to advance it forwardly on the following forward stroke of reciprocation,
whereby on such progressive advancement the blank so engaged from above is carried forwardly of the said supporting and retaining means and delivered into such press.

2. Apparatus for feeding metal blanks to a press or the like, comprising:
   a frame,
   means supported by said frame for aligning such blanks in a vertical stack,
   a delivery rack reciprocably mounted on said frame and including
      support table means whereby a delivery path is established in a plane and extending beneath said aligning means and forwardly therefrom,
      further including arm means extending longitudinally forward of said support table means and above the forward portion of such delivery path, said arm means of said rack being supported therefrom at a point spaced laterally from said path,
   together with
   means to reciprocate said delivery rack forward and aft in such delivery plane,
   means, attendant to such reciprocation of the support table means beneath said aligning means, for disengaging the lowermost of said stacked blanks, whereby it is advanced by said support table means on the forward stroke of such reciprocation,
   means, supported by said frame at the level of said support table means and forwardly along said path, for retaining the blank from aft movement with the support table means on the aft stroke of such reciprocation, and
   means, carried by said arm means and presented downwardly toward such delivery plane, to engage the upper surface of the blank there retained at an aft point of reciprocation and to advance it forwardly on the following forward stroke of reciprocation,
whereby on such progressive advancement the blank so engaged from above is carried forwardly of the retaining means and delivered into such press.

3. Apparatus for feeding sheet metal blanks to a press, or the like, comprising:
   a frame,
   a hopper supported by said frame and aligning such blanks in a vertical stack,
   a delivery rack and means reciprocably mounting said rack on said frame, whereby a planar delivery path is established,
   said delivery rack including
      support table means for supporting from below blanks as released from said hopper and advancing them forwardly a predetermined linear distance from said hopper in such delivery plane, said support table means having stripper means for disengaging the lowermost blank from said hopper,
      waiting station means supported by said frame at the level of said delivery rack support table means and including means for disengaging and retaining advanced blanks from said delivery rack upon the aft movement of said reciprocable delivery rack,
   said delivery rack further having longitudinally-extending arm means forwardly of said support table means and supported spacedly above said delivery path with lateral clearance therefrom, said arm means having means for engaging such advanced blanks from above at an aft point of reciprocation, and advancing it on the next forward stroke a distance equal to said predetermined distance, whereby reciprocation of said delivery rack delivers blanks progressively from said hopper to said waiting station means and thence forwardly to the forwardmost extended position of said arm means.

4. Apparatus for conveying workpieces in a plane from a position at which they are supported from below to a position where they are supported from above, comprising:
 a base frame,
 a two-level delivery rack reciprocably mounted to said frame and including
  a lower aft support table portion reciprocable therewith and having a plurality of parallel and spaced-apart slats whose upper surfaces support and establish a planar delivery path for such workpieces, the said slats extending downward from the plane of said path,
  a riser portion positioned laterally outward of the blank delivery path and connected to the lower support table portion of said rack below such delivery plane, said laterally outward riser portion supporting means bridging above the delivery path at the forward part of the table portion,
  a forwardly extending rail connected to said bridging means and extending forward above the plane of the delivery path such length that when said rack is in its aft position the forward end of said rail is retracted above such apparatus, and when said rack is in its forward position, said forward end projects forwardly of said apparatus,
in combination with
a waiting station slat supported by said base frame at the level of said delivery rack slats, said waiting station slat being staggered with respect to said delivery rack slats,
said waiting station slat having means mounted thereon for preventing aft movement of workpieces conveyed thereto on the said support table rails, whereby such workpieces are retained supported on said waiting station rails and the bridging portion passes thereover on the aft stroke of reciprocation,
said forwardly extending rail of said delivery rack including grasping means carried along to its under surface for engaging workpieces so resting upon said waiting station rails, and
means mechanically coupled to said delivery rack for reciprocating it forward and aft along such delivery path.

5. The apparatus defined in claim 4, wherein said grasping means includes a permanent magnet secured to the under surface of said forward rail of said delivery rack and presented downwardly thereof, whereby a workpiece so resting on said waiting station rail may be engaged by said permanent magnet from above on the return stroke of said delivery rack and advanced forwardly on the forward stroke of rack reciprocation.

6. The apparatus defined in claim 5, wherein said waiting station detachment means includes a dog mounted to said rail and having a forward face spring-urged to extend above the level thereof, said dog being mounted aft of the aft-reciprocated portion of said grasping means, whereby on the aft stroke of reciprocation said magnet drives and holds the workpieces positively against the forward face of the dog.

7. Apparatus for feeding sheet metal blanks to a press, or the like, comprising:
 a frame including a forward support portion and an aft support portion, said aft portion supporting two parallel longitudinally-extending shafts,
 an open bottom hopper supported by said frame spacedly above said longitudinally-extending shafts, whereby such blanks may be aligned in a stack,
 a two-level stepped delivery rack reciprocably mounted on said longitudinally-extending shafts for forward and aft movement therealong, whereby a planar delivery path for such blanks between said levels is established,
said two-level delivery rack including
  an aft, lower support table portion having a plurality of parallel slats spaced from each other and extending forward with their upper surfaces presented to the open bottom of said hopper at such delivery plane,
  riser portions positioned laterally outward of the delivery path and connected to said support table portion below the delivery plane, said riser portions being joined above the delivery plane by a bar bridging such delivery path, and
  parallel rails connected to said bridging bar and extending forward above the delivery path such length that when the rack is in an aft position their forward ends are retracted above said apparatus and when said rack is in its forward position said ends project forwardly of said apparatus,
together with
a hopper-unloading blank stripper carried by said support table portion of said delivery rack,
a plurality of parallel, spaced-apart waiting station slats mounted on said forward portion of said frame at the level of said support table slats of said delivery rack, said waiting station rails being staggered laterally of said support table slats of said rack and extending aft of their support, whereby said support table slats may nest therebetween when moved to their forwardmost position;
grasping means carried by said forwardly extending rails adjacent to their forward ends for engaging blanks from above,
means carried by said waiting station rails for detaching such blanks from said delivery rack table portion and retaining them thereat during the aft movement of said rack, and
means mechanically connected to said delivery rack for reciprocating it forward and aft along said longitudinally-extending shafts.

References Cited by the Examiner
UNITED STATES PATENTS

| | | | |
|---|---|---|---|
| 1,343,648 | 6/1920 | Smith | 271—74 |
| 1,538,184 | 5/1925 | Hale | 271—54 |
| 1,780,049 | 10/1930 | Troyer | 271—54 |
| 2,535,853 | 12/1960 | Hermani. | |
| 3,073,593 | 1/1963 | Bauer | 271—54 X |

M. HENSON WOOD, Jr., *Primary Examiner.*

ALLEN KNOWLES, *Examiner.*